(12) United States Patent
Sakai

(10) Patent No.: US 8,192,225 B2
(45) Date of Patent: Jun. 5, 2012

(54) PRESS-CONTACT CONNECTION APPARATUS AND ILLUMINATION APPARATUS

(75) Inventor: Manabu Sakai, Makinohara (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 13/176,789

(22) Filed: Jul. 6, 2011

(65) Prior Publication Data
US 2012/0009814 A1 Jan. 12, 2012

(30) Foreign Application Priority Data
Jul. 6, 2010 (JP) ................................. 2010-153527

(51) Int. Cl.
*H01R 4/24* (2006.01)

(52) U.S. Cl. ...................................................... 439/409

(58) Field of Classification Search .................. 439/409, 439/410
See application file for complete search history.

(56) References Cited

U.S. PATENT DOCUMENTS

| | | | |
|---|---|---|---|
| 4,455,058 A * | 6/1984 | Harner et al. ................. | 439/409 |
| 5,785,548 A * | 7/1998 | Capper et al. ................. | 439/409 |
| 5,947,761 A * | 9/1999 | Pepe .............................. | 439/409 |
| 6,254,421 B1 * | 7/2001 | Denovich et al. ............. | 439/409 |
| 6,406,324 B1 * | 6/2002 | Duesterhoeft et al. ........ | 439/409 |
| 7,066,764 B2 * | 6/2006 | Bolouri-Saransar .......... | 439/409 |
| 7,753,716 B2 * | 7/2010 | Cox et al. ...................... | 439/409 |
| 7,758,372 B2 * | 7/2010 | Jaouen et al. ................. | 439/409 |

FOREIGN PATENT DOCUMENTS

JP 2005-332796 A 12/2005

* cited by examiner

*Primary Examiner* — Tho D Ta
(74) *Attorney, Agent, or Firm* — Sughrue Mion, PLLC

(57) ABSTRACT

There is provided a press-contact connection apparatus, including: a base part; press-contact terminals which are fixed to the base part; and an electric wire holder which holds a plurality of electric wires to be press-contacted with the press-contact terminals. The base part includes a support which supports the electric wire holder rotatably and serves as a fulcrum of a rotation of the electric wire, and a first engagement portion. The electric wire holder includes a rotational shaft which is provided in one end portion of the electric wire holder and supported by the support of the base part, and a second engagement portion to be engaged with the first engagement portion. The electric wire holder is pulled between the support and the first engagement portion when the electric wire holder is rotated about the rotational shaft and the plurality of electric wires are being press-contacted to the respective press-contact terminals.

6 Claims, 12 Drawing Sheets

PRESS-CONTACT CONNECTION APPARATUS AND ILLUMINATION APPARATUS

BACKGROUND OF THE INVENTION

1. Technical Field

The present invention relates to a press-contact connection apparatus and an illumination apparatus provided with the press-contact connection apparatus.

2. Background Art

In the past, there has been known a press-contact connection apparatus which press-contacts an electric wire within a groove of a press-contact blade of a press-contact terminal when the electric wire is to be connected to the terminal. Here, the "press-contact" means that the electric wire is pressed onto the press-contact terminal, and an insulative coat of the electric wire is cut out with the press-contact blade of the press-contact terminal, thereby causing a core wire which is exposed by the cut-out to be contact with the press-contact terminal. For example, there is proposed a connector having a function of press-contacting a plurality of electric wires onto respective press-contact terminals in JP2005-332796A.

In the connector disclosed in JP2005-332796A, the plurality of electric wires are held by a housing including press-contact terminals, and the plurality of electric wires are press-contact to the press-contact terminals by applying a pressing force with respect to the plurality of electric wires from above the housing by a press-contact cover.

In the connector disclosed in JP2005-332796A, however, since a load must be applied to the plurality of electric wires at the time of press-contact, the press-contact cover may be bent during the press-contact. As a result, it is difficult to press-contact the plurality of electric wires uniformly.

SUMMARY OF THE INVENTION

The present invention is achieved in view of the above problems, and aims at providing a press-contact connection apparatus capable of press-contacting a plurality of electric wires uniformly and an illumination apparatus provided with the press-contact connection apparatus.

There is provided a press-contact connection apparatus, including: a base part; press-contact terminals which are fixed to the base part; and an electric wire holder which holds a plurality of electric wires to be press-contacted with the press-contact terminals. The base part includes a support which supports the electric wire holder rotatably and serves as a fulcrum of a rotation of the electric wire, and a first engagement portion. The electric wire holder includes a rotational shaft which is provided in one end portion of the electric wire holder and supported by the support of the base part, and a second engagement portion to be engaged with the first engagement portion. The electric wire holder is pulled between the support and the first engagement portion when the electric wire holder is rotated about the rotational shaft and the plurality of electric wires are being press-contacted to the respective press-contact terminals.

According to the configuration, the electric wire holder is pulled between the support and the first engagement portion when the electric wire holder is rotated about the rotational shaft and the plurality of electric wires are being press-contacted to the respective press-contact terminals. Thus, the deformation of the electric wire holder which should occur during the press-contact is prevented. Consequently, the plurality of electric wires can be press-contacted uniformly.

DETAILED DESCRIPTION OF THE EXEMPLARY EMBODIMENTS

Figure 1:
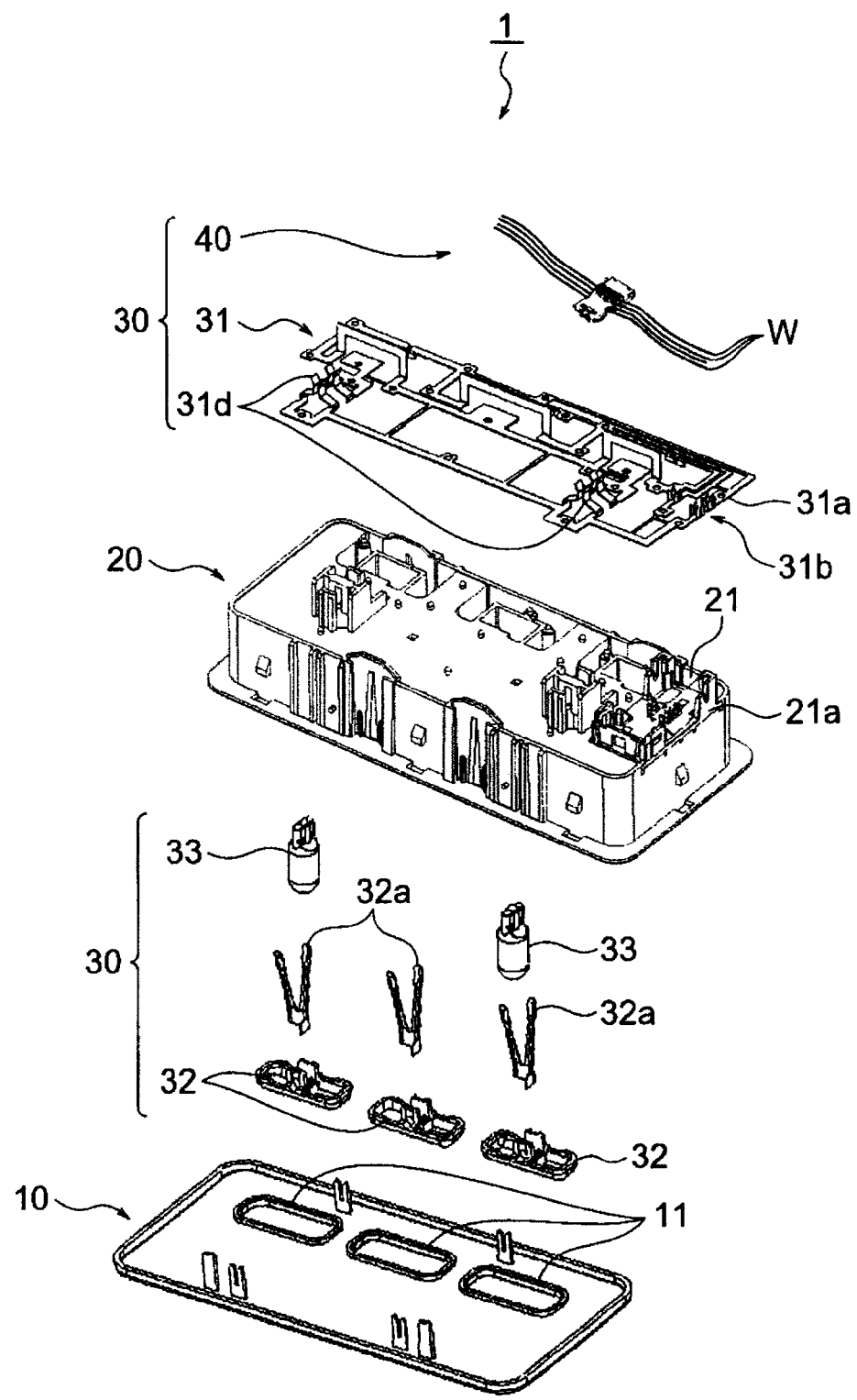
FIG. 1 is an exploded perspective view of an illumination apparatus provided with a press-contact connection apparatus according to an embodiment of the invention.

The present invention provides, as a first aspect, a press-contact connection apparatus, including: a base part; press-contact terminals which are fixed to the base part; and an electric wire holder which holds a plurality of electric wires to be press-contacted with the press-contact terminals, wherein the base part includes a support which supports the electric wire holder rotatably and serves as a fulcrum of a rotation of the electric wire, and a first engagement portion; the electric wire holder includes a rotational shaft which is provided in one end portion of the electric wire holder and supported by the support of the base part, and a second engagement portion to be engaged with the first engagement portion; and the electric wire holder is pulled between the support and the first engagement portion when the electric wire holder is rotated about the rotational shaft and the plurality of electric wires are being press-contacted to the respective press-contact terminals.

The press-contact connection apparatus may be configured, as a second aspect, so that the first engagement portion is projections, and the second engagement portion is notches formed at both sides of the electric wire holder.

The press-contact connection apparatus may be configured, as a third aspect, so that the first engagement portion is projections, and the second engagement portion is through holes formed through the electric wire holder.

The press-contact connection apparatus may be configured, as a fourth aspect, so that each of the projections includes an inclined surface which is inclined from the base part and directed toward the support of the base part, and an upstanding surface which stands vertically from the base part, and each of the notches has opposing wall surfaces so as to enlarge a clearance between the opposing wall surfaces downwardly.

The present invention also provides, as a fifth aspect, an illumination apparatus provided with the press-contact connection apparatus, wherein the illumination apparatus is capable of an illumination function by supplying a power from the plurality of electric wires which are press-contacted with the press-contact terminals of the press-contact connection apparatus.

According to the first aspect, the electric wire holder is pulled between the support and the first engagement portion when the electric wire holder is rotated about the rotational shaft and the plurality of electric wires are being press-contacted to the respective press-contact terminals. Thus, the deformation of the electric wire holder which should occur during the press-contact is prevented. Consequently, the plurality of electric wires can be press-contacted uniformly.

According to the second aspect, the electric wire holder is engaged to the base part with the projection and the notch, and the electric wire holder is pulled between the support and the first engagement portion. Thus, the deformation of the electric wire holder which should occur during the press-contact is prevented by the simple structure.

According to the third aspect, the electric wire holder is engaged to the base part with the projection and the through hole, and the electric wire holder is pulled between the support and the first engagement portion. Thus, the deformation of the electric wire holder which should occur during the press-contact is prevented by the simple structure.

According to the fourth aspect, since one of the opposing wall surfaces faces the inclined surface, but the clearance between the opposing wall surfaces is enlarged downwardly, the one of the opposing wall surfaces does not contact the projection until the completion of the press-contact. In this case, the electric wire holder is pulled between the support and the first engagement portion. Thus, the deformation of the electric wire holder which should occur during the press-contact is prevented.

According to the fifth aspect, since the illumination apparatus is provided with the press-contact connection apparatus, the same advantageous effects can be obtained as the press-contact connection apparatus.

An exemplary embodiment of an illumination apparatus provided with a press-contact connection apparatus according to an aspect of the invention will be described in detail with reference to accompanying drawings. Note that the present invention is not limited only to the exemplary embodiment as mentioned below.

Embodiment

Figure 2:
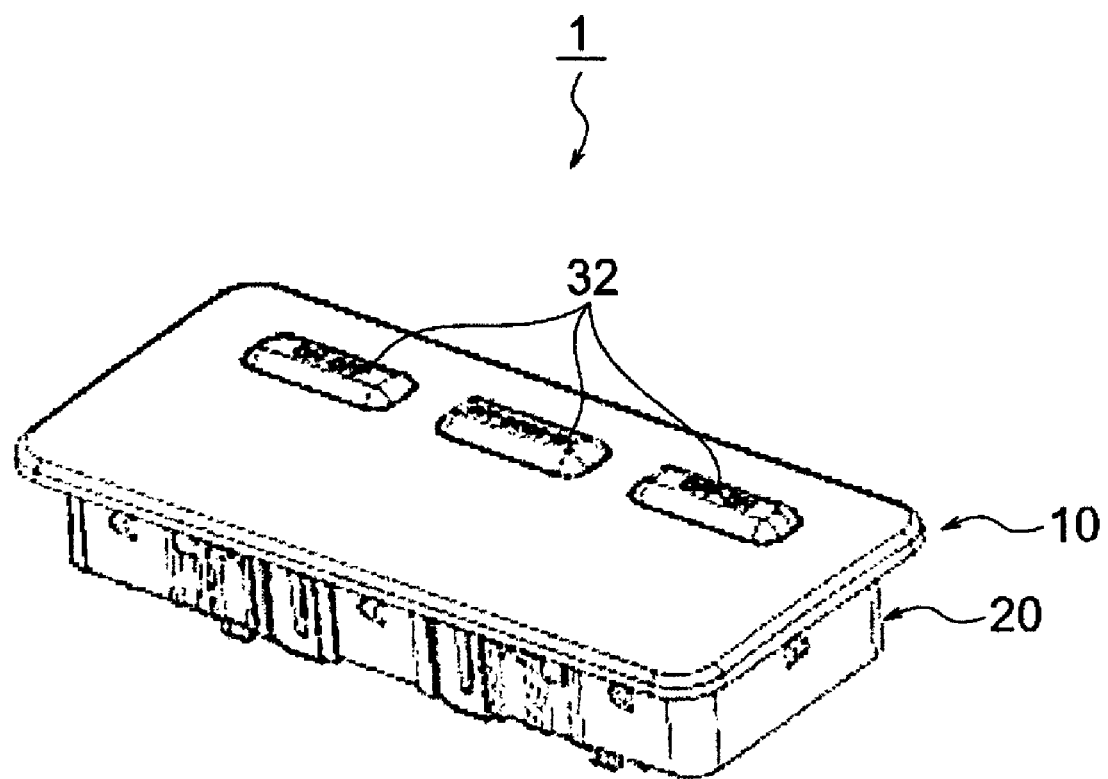
FIG. 2 is a perspective view of the illumination apparatus shown in FIG. 1.

FIG. 1 is an exploded perspective view of an illumination apparatus 1 provided with a press-contact connection apparatus 100 according to an embodiment of the invention. FIG. 2 is a perspective view of the illumination apparatus 1 shown in FIG. 1. The illumination apparatus 1 is disposed, for example, on a ceiling of a vehicle, and illuminates inside the vehicle. In the illumination apparatus 1, a plurality of electric wires W are press-contacted with press-contact terminals 31$b$. Thus, power supply from the plurality of electric wires W is enabled. The illumination apparatus 1 includes a lens body 10, a housing 20 and an illumination-function part 30 as shown in FIG. 1.

The lens body 10 has a rectangular outer shape. Three operator reception holes 11 are formed in the lens body 10.

The illumination-function part 30 is incorporated into the housing 20. The housing 20 is attached to the lens body 10 with the illumination-function part 30 incorporated into the housing 20. The housing 20 includes a holder-receiver 21 for receiving an electric wire holder 40 described later.

The illumination-function part 30 includes a bus bar 31, switch operating parts 32, valves 33 and the electric wire holder 40 which holds the plurality of electric wires W. The bus bar 31 includes a power-feed terminal 31$d$ and a press-contact terminal 31$b$ provided with a press-contact blade 31$a$ to which the electric wire W is to be connected. The switch operating part 32 is received within the housing 20. The switch operating part 32 is an operating part for switching an operation state between a light-on and a light-off of the valve 33. The switch operating part 32 enables an electric conduction to the valve 33 by contact with the power-feed terminal 31$d$ via a contact 32$a$.

Figure 3:
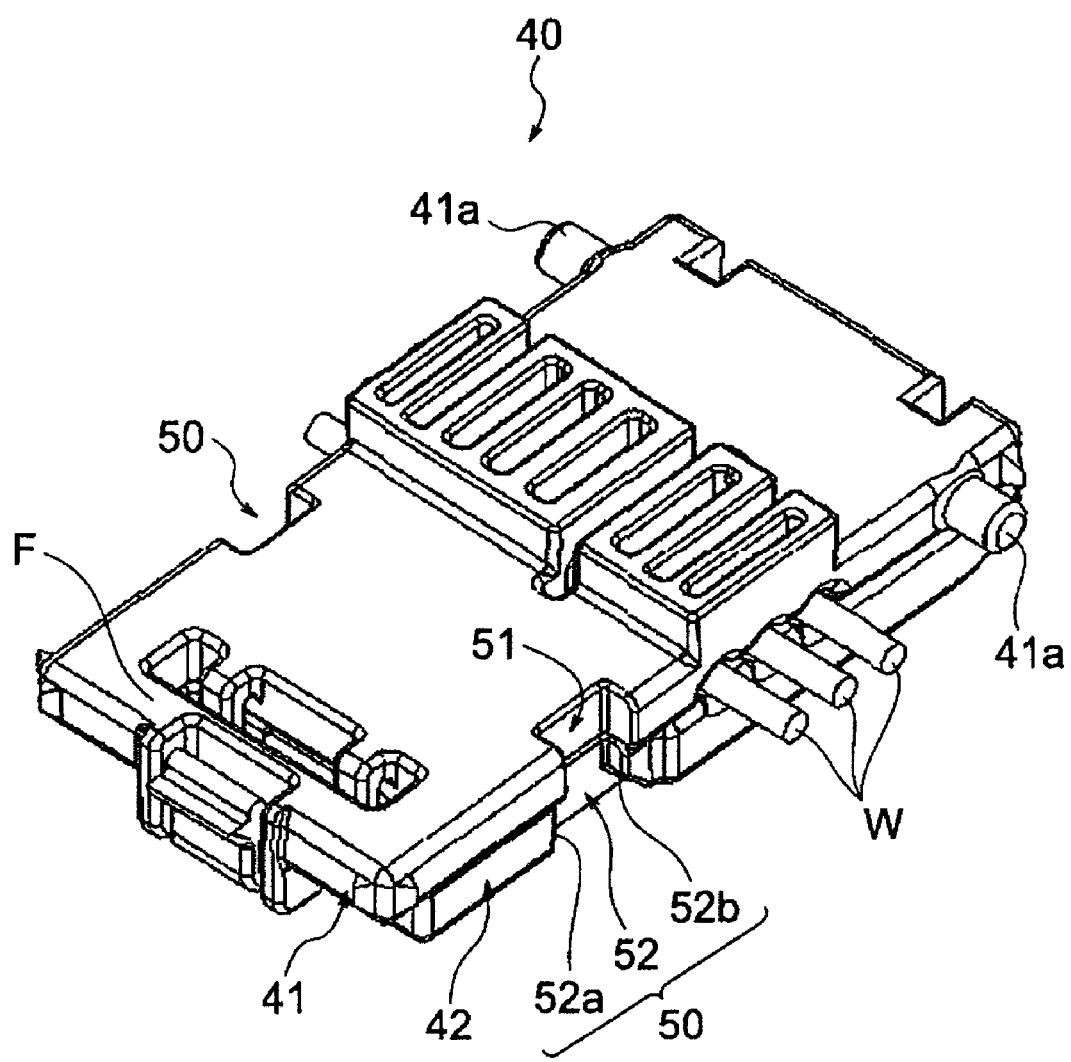
FIG. 3 is a perspective view of an electric wire holder shown in FIG. 1.
Figure 4:
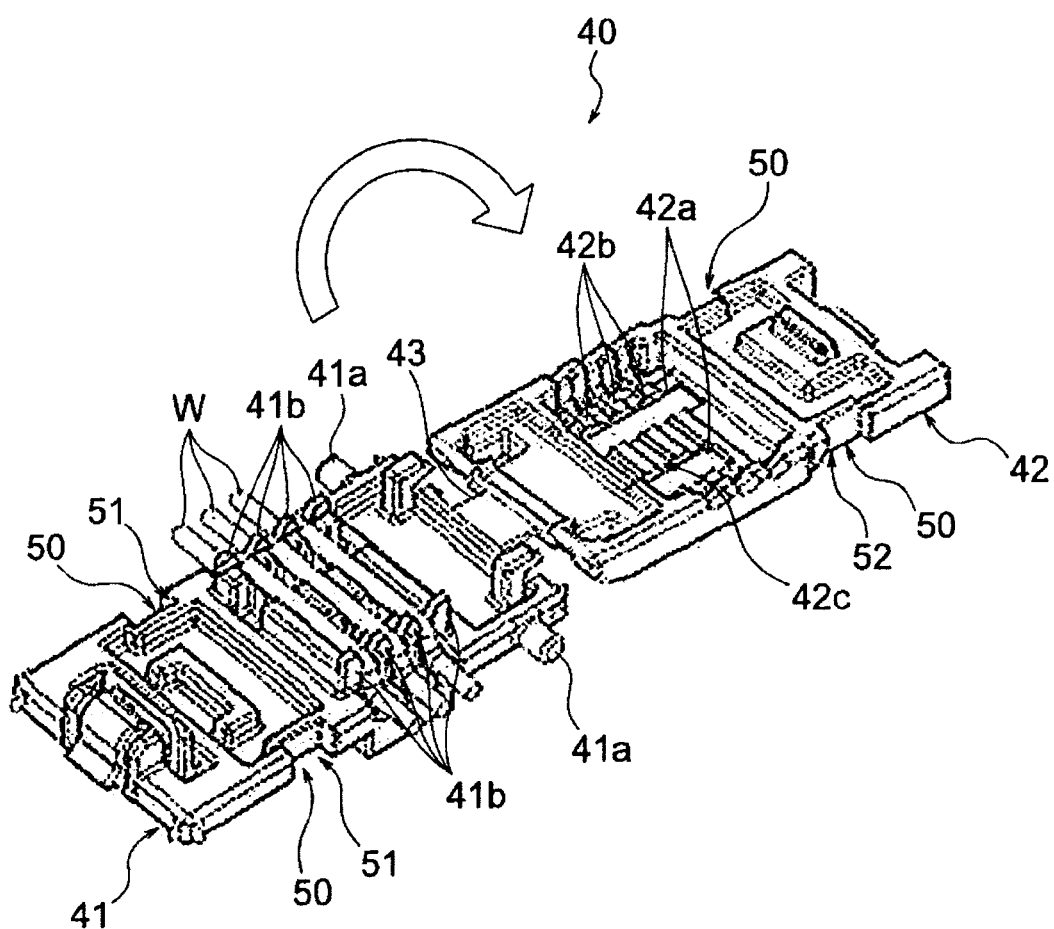
FIG. 4 is a perspective view of the electric wire holder in a state where an engagement of an upper pressing portion and a lower pressing portion of the electric wire holder are released.

The electric wire holder 40 holds the plurality of electric wires side by side. The plurality of electric wires W are press-contacted with the press-contact terminals 31$b$ by pressing the plurality of electric wires W held by the electric wire holder 40 onto the press-contact terminals 31$b$. In the electric wire holder 40, as shown in FIG. 3 and FIG. 4, an upper pressing portion 41 is coupled to a lower pressing portion 42 via a bendable coupling portion 43. The electric wire holder 40 holds the plurality of electric wires W so as to extend them in an axial direction of a rotational shaft 41$a$ by bending the coupling portion 43 and sandwiching the plurality of electric wires W between the upper pressing portion 41 and the lower pressing portion 42.

The upper pressing portion 41 includes the rotational shaft 41$a$, a press-applying portion F and partitions 41$b$. The rotational shaft 41$a$ has a columnar shape, and is disposed in the vicinity of an end of the upper pressing portion 41 near the coupling portion 43. The press-applying portion F is provided at the other end when the side of the coupling portion 43 is considered as one end. The press-applying portion F is a portion for applying a pressure when the plurality of electric wires W held by the electric wire holder 40 is pressed onto the press-contact terminals 31$b$. The partitions 41$b$ separate and hold the plurality of electric wires W, as shown in FIG. 4.

The lower pressing portion 42 includes press-contact through portions 42$a$, penetration portions 42$b$ and guide portions 42$c$. The press-contact through portion 42$a$ is a through hole through which the press-contact blade 31$a$ is passed through. The penetration portion 42$b$ is a portion through which a projection of the partition 41$b$ is penetrated. The guide portions 42$c$ are disposed in positions corresponding to the plurality of electric wires W held by the upper pressing portion 41, and guide the plurality of electric wires W, respectively.

Further the electric wire holder 40 includes notches 50 (a second engagement portion) each having a concave in cross-section. The notch 50 is formed by a connection of an upper notch 51 and a lower notch 52. The upper notches 51 are formed at both sides of the upper pressing portion 41. The lower notches 52 are formed at both sides of the lower pressing portion 42. In the upper notch 51, normal lines to opposing wall surfaces of walls which define the upper notch 51 are parallel to each other.

On the other hand, in the lower notch 52, a clearance between opposing wall surfaces of walls which define the lower notch 52 is enlarged downwardly. Specifically, as shown in FIG. 3, a normal line to a wall surface 52a (hereinafter, referred to as a rotational-shaft-opposite-side wall surface 52a) opposing to the rotational shaft 41a of the wall surfaces which define the lower notch 52 is formed orthogonal to a normal line to a bottom surface of the lower pressing portion 42. Further, a wall surface 52b (hereinafter, referred to as a rotational-shaft-side wall surface 52b) at a side of the rotational shaft 41a of the wall surfaces which define the lower notch 52 is formed so as to enlarge the clearance between the opposing wall surfaces downwardly.

Figure 5:
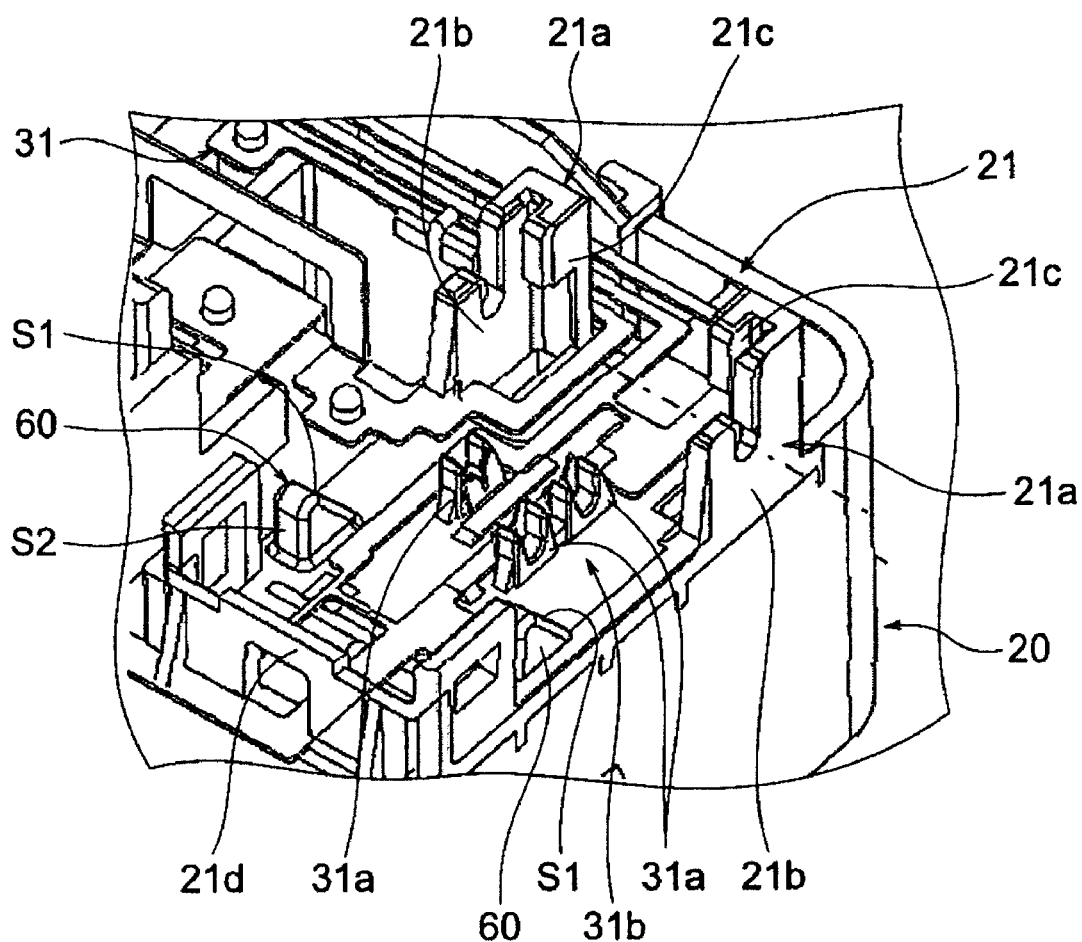
FIG. 5 is an enlarged perspective view of a holder-receiver before attachment of the electric wire holder to the holder-receiver.
Figure 6:
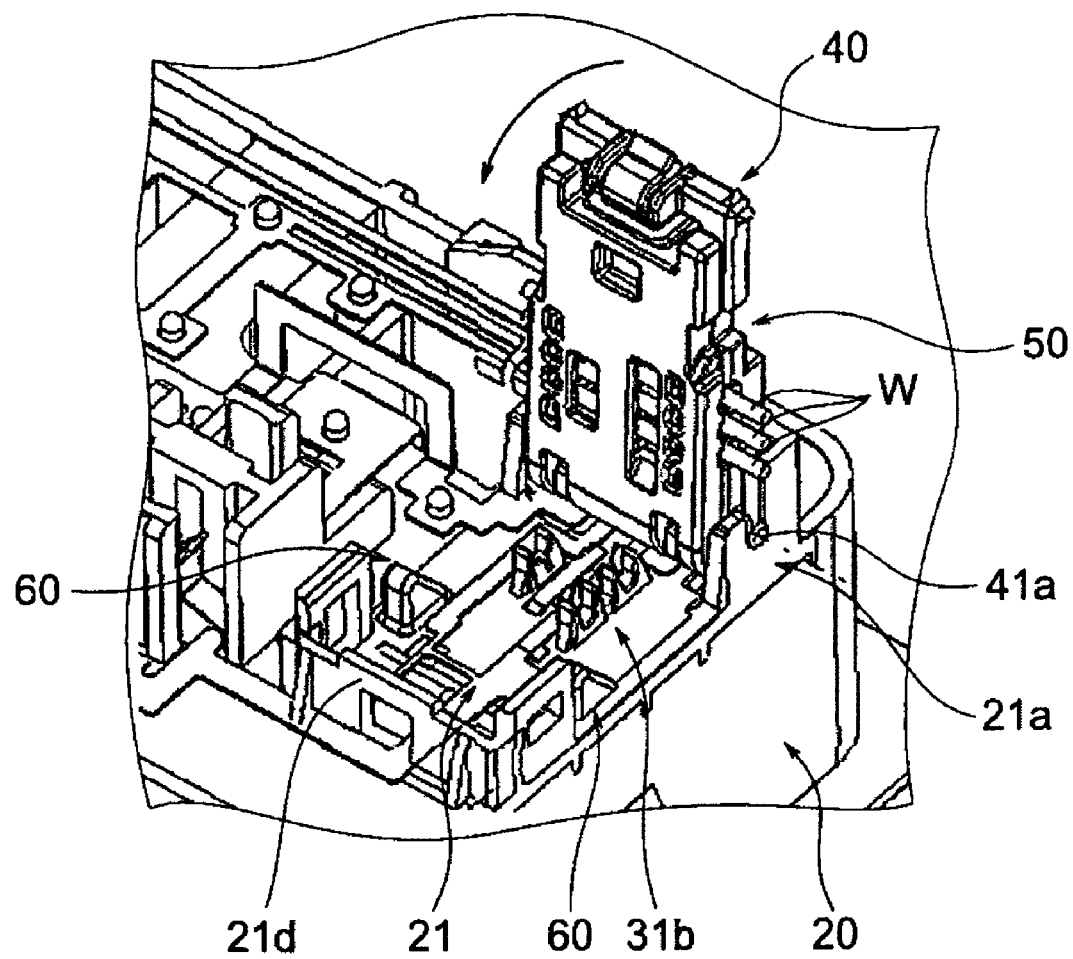
FIG. 6 is a diagram for explaining that a rotational shaft of the electric wire holder is rotatably supported by a support.
Figure 7:
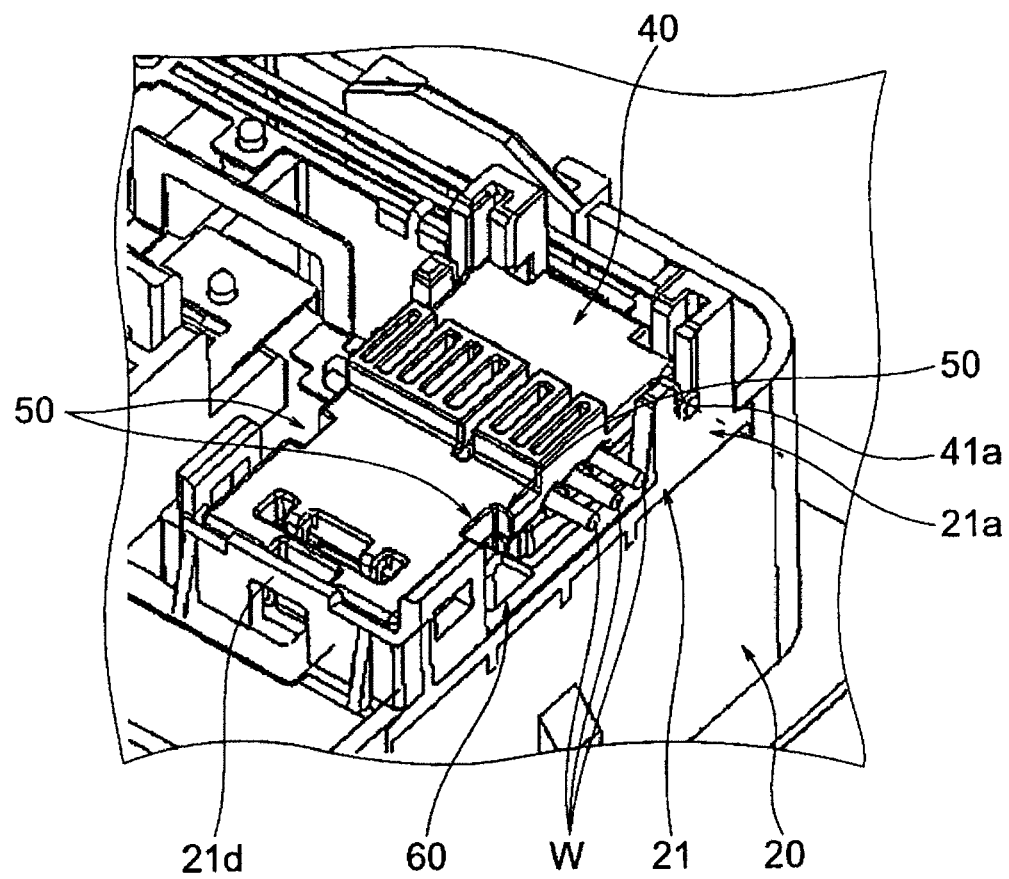
FIG. 7 is a diagram for explaining that the electric wire holder is fixed to a housing by a locking part.

Here, the holder-receiver 21 included in the housing 20 is explained in detail with reference to FIG. 5 through FIG. 7. FIG. 5 is an enlarged perspective view of the holder-receiver 21 before attachment of the electric wire holder 40 to the holder-receiver 21. FIG. 6 is a diagram for explaining that the rotational shaft 41a of the electric wire holder 40 is rotatably supported by a support 21a. FIG. 7 is a diagram for explaining that the electric wire holder 40 is fixed to a housing 20 by a locking part 21d.

The holder-receiver 21 includes supports 21a, locking parts 21d and deformation-prevention ribs 60 (a first engagement portion), as shown in FIG. 5. The support 21a supports the rotational shaft 41a included in the electric wire holder 40 rotatably as shown in FIG. 6. The support 21a includes a bearing wall 21b which supports the rotational shaft 41a and a projection wall 21c serving as a fulcrum. The projection wall 21c is a wall which projects towards the attachment side of the electric wire holder 40.

The locking part 21d fixes the electric wire holder 40 which is rotatably supported by the support 21a to the housing 20, as shown in FIG. 7.

The deformation-prevention rib 60 is a portion to be engaged with the notch 50. As shown in FIG. 5, in the deformation-prevention rib 60, the cross-section in the vertical direction forms a projection having a right-angled triangular shape, and its upper corner is rounded. The deformation-prevention rib 60 is formed so that an inclined surface S1 is directed toward the support 21a in a position corresponding to the notch 50, and an upstanding surface S2 which stands vertically from the housing 20 is directed oppositely to the support 21a. More specifically, when the electric wire holder 40 is rotated, the rotational-shaft-opposite-side wall surface 52a of the notch 50 starts to contact the upper portion of the deformation-prevention rib 60 at first.

On the other hand, since the rotational-shaft-side wall surface 52b of the notch 50 faces the inclined surface S1 of the deformation-prevention rib 60, but the clearance between the opposing wall surfaces is enlarged downwardly, the rotational-shaft-side wall surface 52b does not contact the deformation-prevention rib 60 until the completion of the press-contact. Consequently, the rotational-shaft-side wall surface 52b receives the reaction force from the upstanding surface S2 until the completion of the press-contact. That is, the electric wire holder 40 receives a tensile force from the rotational shaft 41a toward the press-applying portion F until the completion of the press-contact from the contact with the deformation-prevention rib 60.

Figure 8:
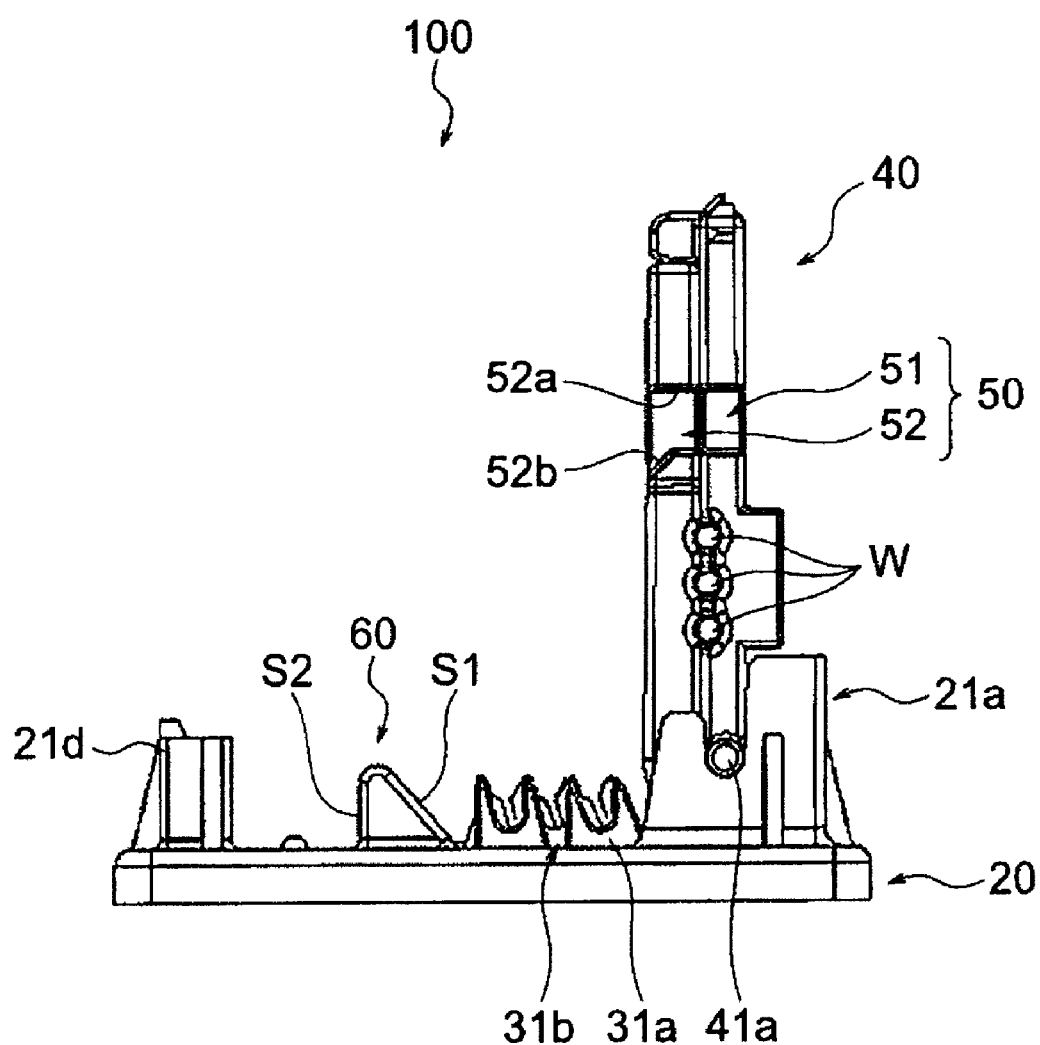
FIG. 8 is a diagram showing the press-contact connection apparatus according to the embodiment of the invention.

Here, the press-contact connection apparatus 100 according to the embodiment of the invention is explained with reference to FIG. 8. FIG. 8 is a diagram showing the press-contact connection apparatus 100 according to the embodiment of the invention. The press-contact connection apparatus 100 includes the electric wire holder 40, the housing 20 as a base part and the press-contact terminals 31b fixed to the housing 20. The press-contact connection apparatus 100 press-contacts the plurality of electric wires W onto the press-contact terminals 31b by pressing the plurality of electric wires W held by the electric wire holder 40 onto the press-contact terminals 31b.

Figure 9:
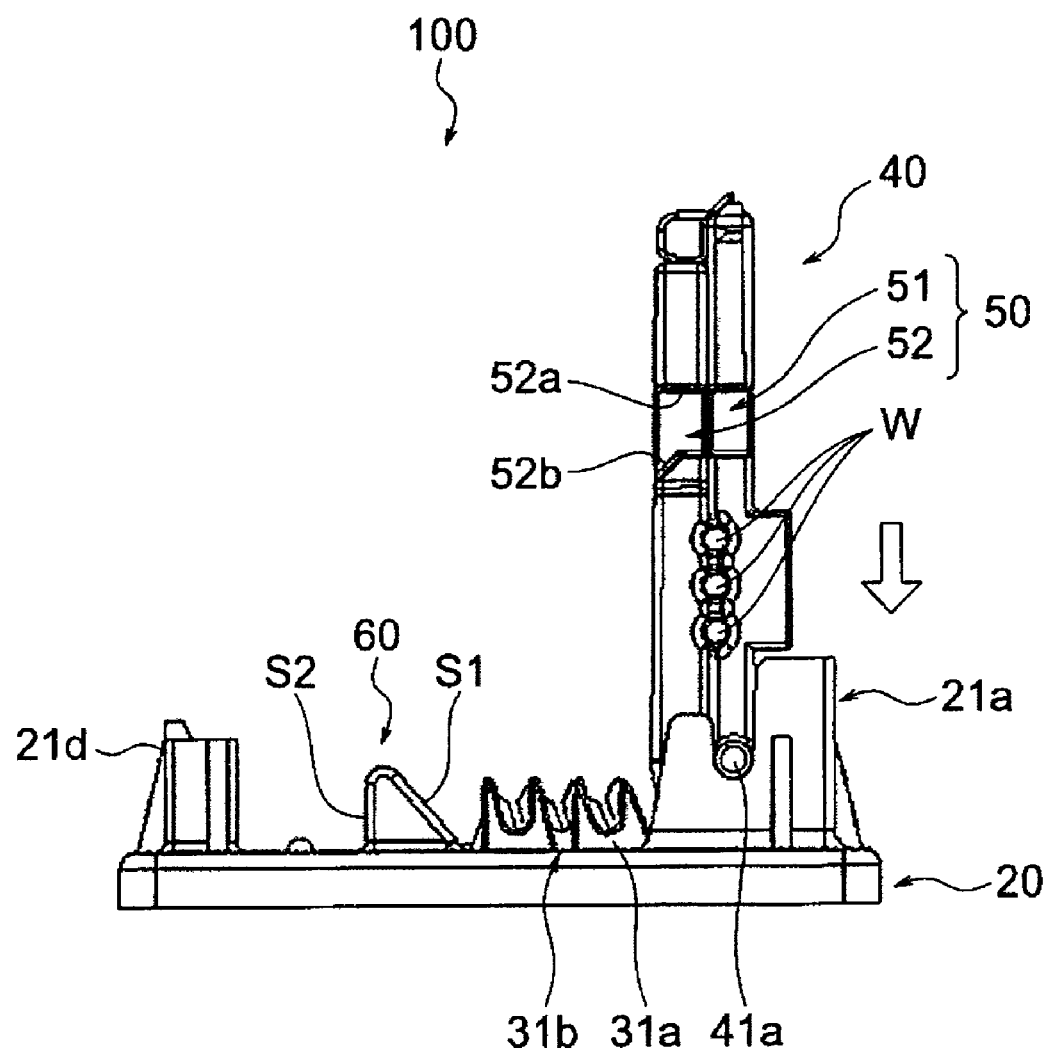
FIG. 9 is a diagram showing a procedure of press-contacting a plurality of electric wires onto press-contact terminals by the press-contact connection apparatus.
Figure 10:
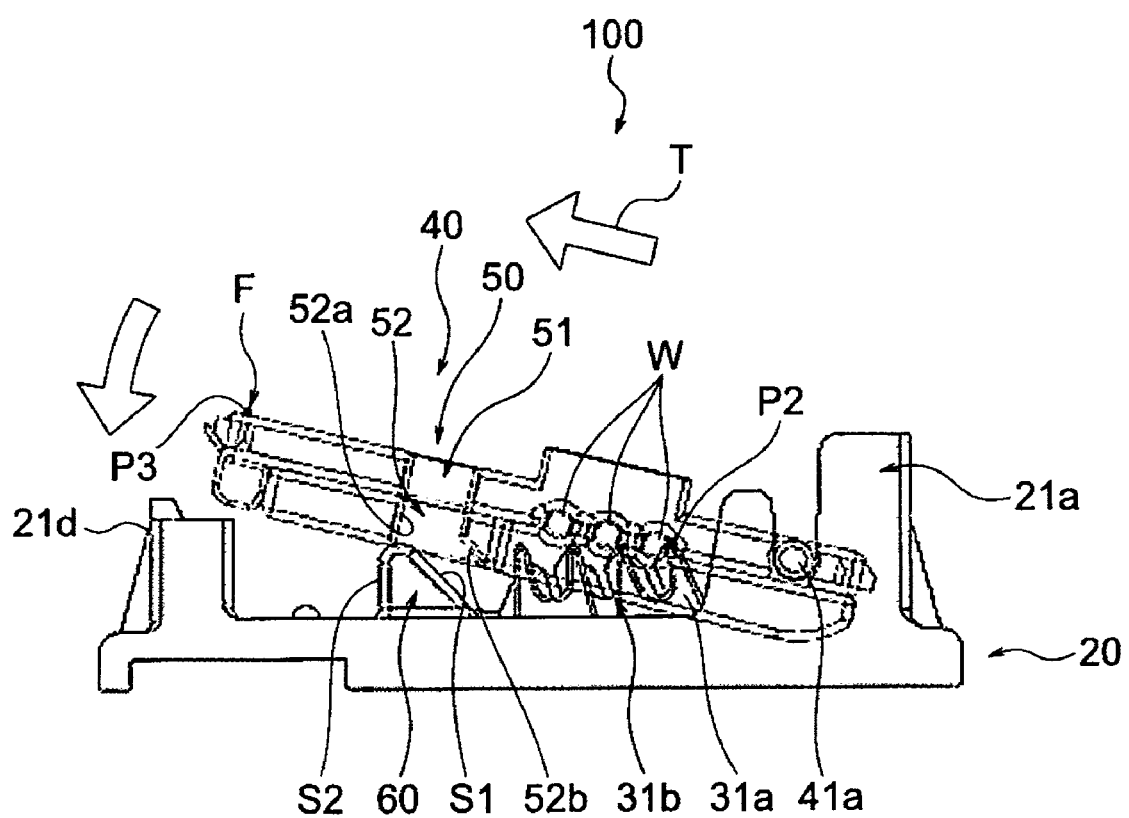
FIG. 10 is a diagram showing the procedure of press-contacting the plurality of electric wires onto the press-contact terminals by the press-contact connection apparatus.
Figure 11:
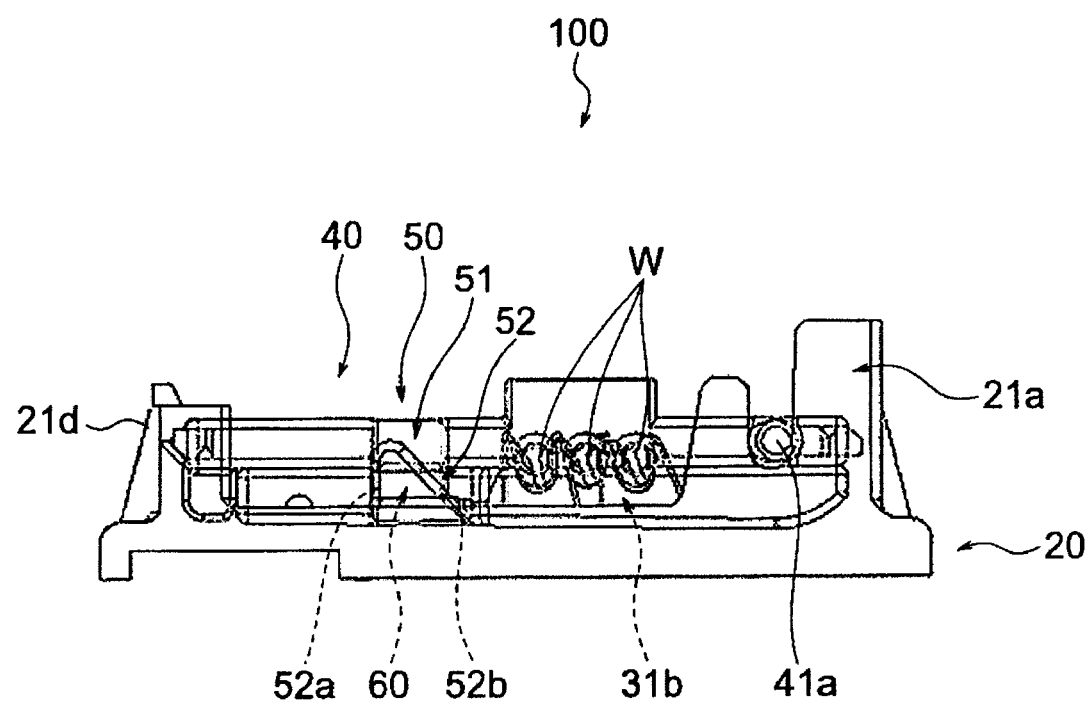
FIG. 11 is a diagram showing the procedure of press-contacting the plurality of electric wires onto the press-contact terminals by the press-contact connection apparatus.

Next, a procedure of press-contacting the plurality of electric wires W onto the press-contact terminals 31b by the press-contact connection apparatus 100 is explained with reference to FIG. 9 through FIG. 11. FIG. 9 through FIG. 11 are diagrams showing a procedure of press-contacting the plurality of electric wires W onto the press-contact terminals 31b by the press-contact connection apparatus 100.

First, the rotational shaft 41a of the electric wire holder 40 is attached to the supports 21a (see FIG. 9).

Figure 12:
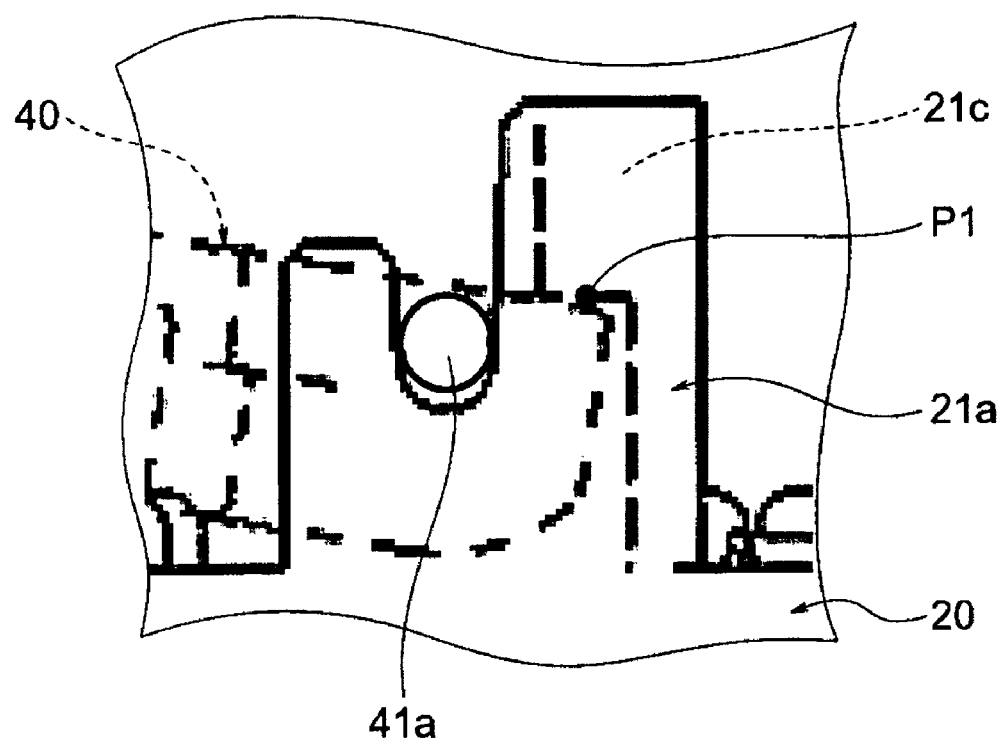
FIG. 12 is a diagram for explaining that, when the electric wires contact press-contact blades, the electric wire holder contacts a projection wall by the reaction force.

Then, the electric wire holder 40 is rotated around the rotational shaft 41a (see FIG. 10). When the electric wires W contact the press-contact blades 31a in accordance with the rotation of the electric wire holder 40, the electric wire holder 40 contacts the projection wall 21c by the reaction force (see FIG. 12). In this case, the projection wall 21c serves as a fulcrum P1 in the principle of leverage. At this time, the electric wires W are press-contacted while the projection wall 21c serves as the fulcrum P1, the press-contacted electric wires W serve as a point of action P2, and the press-applying portion F serves as a point of effort P3.

The deformation-prevention ribs 60 start to contact the respective notches 50. In this case, the upper portion at which the corner of the deformation-prevention rib 60 is rounded starts to contact the rotational-shaft-opposite-side wall surface 52a of the notch 50. The rotational-shaft-opposite-side wall surface 52a receives the reaction force towards a direction T opposite to the rotational shaft 41a by contact with the deformation-prevention rib 60. The reaction force corresponds to a tensile force for pulling the electric wire holder 40 supported by the support 21a in an opposite side of the rotational shaft 41a. At this time, the rotational-shaft-side wall surface 52b does not contact the deformation-prevention rib 60.

Then, as the electric wire holder 40 is further rotated, the electric wire holder 40 is fixed to the housing 20 by the locking portion 21d, and the press-contact is completed (see FIG. 11).

In the press-contact connection apparatus 100 according to the embodiment, when the plurality of electric wires W are to be press-contacted by the rotation of the electric wire holder around the rotational shaft 41a, the electric wire holder 40 is pulled between the supports 21a and the deformation-prevention ribs 60. Thus, the deformation of the electric wire holder 40 which should occur during the press-contact is prevented. Consequently, the plurality of electric wires W can be press-contacted uniformly.

Further, in the press-contact connection apparatus 100 according to the embodiment, the electric wire holder 40 is engaged to the housing 20 by the deformation-prevention rib 60 and the notch 50, and the electric wire holder 40 is pulled between the support 21a and the deformation-prevention rib 60. Thus, the deformation of the electric wire holder 40 which should occur during the press-contact is prevented by the simple structure.

In the press-contact connection apparatus 100 according to the embodiment, the notch 50 is exemplified as an engagement portion with the deformation-prevention rib 60, but it is not limited to the notch. In this case, it is only necessary to provide any portion by which the electric wire holder 40 receives the tensile force from the rotational shaft 41a toward the press-applying portion F until the completion of the press-contact from the contact with the deformation-prevention rib 60. For example, a through hole to be engaged with the deformation-prevention rib 60 may be provided in the vicinity of the press-applying portion F of the electric wire holder 40. Also in this case, the deformation of the electric wire holder 40 which should occur during the press-contact is prevented by the simple structure.

What is claimed is:

1. A press-contact connection apparatus, comprising:
a base part;
press-contact terminals which are fixed to the base part; and
an electric wire holder which is adapted to hold a plurality of electric wires to be press-contacted with the respective press-contact terminals, wherein
the base part includes a support which supports the electric wire holder rotatably and serves as a fulcrum of a rotation of the electric wire, a locking part that fixes the electric wire holder to the base part and a first engagement portion that is provided between the support and the locking part,
the electric wire holder includes a rotational shaft which is provided in one end portion of the electric wire holder and supported by the support of the base part, and a second engagement portion to be engaged with the first engagement portion, and
the electric wire holder is pulled in a direction from the rotational shaft toward the second engagement portion by a reaction force from the first engagement portion when the electric wire holder is rotated about the rotational shaft and the plurality of electric wires are being press-contacted to the respective press-contact terminals.

2. The press-contact connection apparatus according to claim 1, wherein
the first engagement portion is projections, and
the second engagement portion is notches formed at both sides of the electric wire holder.

3. The press-contact connection apparatus according to claim 1, wherein
the first engagement portion is projections, and
the second engagement portion is through holes formed through the electric wire holder.

4. The press-contact connection apparatus according to claim 2, wherein
each of the projections includes an inclined surface which is inclined from the base part and directed toward the support of the base part, and an upstanding surface which stands vertically from the base part, and
each of the notches has opposing wall surfaces so as to enlarge a clearance between the opposing wall surfaces downwardly.

5. An illumination apparatus provided with the press-contact connection apparatus according to claim 1, wherein
the illumination apparatus provides an illumination function by supplying a power from the plurality of electric wires which are press-contacted with the press-contact terminals of the press-contact connection apparatus.

6. The press-contact connection apparatus according to claim 1, wherein
the first engagement portion is projections,
each of the projections includes an inclined surface which is inclined from the base part and directed toward the support of the base part, and an upstanding surface which stands vertically from the base part, and
the electric wire holder receives the reaction force from the upstanding surface from when the first engagement portion starts to be engaged with the second engagement portion.

* * * * *